(12) United States Patent
Matthes et al.

(10) Patent No.: US 12,038,033 B2
(45) Date of Patent: Jul. 16, 2024

(54) ANGLE COUPLING

(71) Applicant: BÖLLHOFF VERBINDUNGSTECHNIK GmbH, Bielefeld (DE)

(72) Inventors: Jörg Matthes, Herford (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 1105 days.

(21) Appl. No.: 16/754,168

(22) PCT Filed: Sep. 26, 2018

(86) PCT No.: PCT/EP2018/076064
§ 371 (c)(1),
(2) Date: Apr. 7, 2020

(87) PCT Pub. No.: WO2019/072556
PCT Pub. Date: Apr. 18, 2019

(65) Prior Publication Data
US 2020/0332819 A1 Oct. 22, 2020

(30) Foreign Application Priority Data
Oct. 9, 2017 (DE) .......................... 102017123424.1

(51) Int. Cl.
*F16B 21/07* (2006.01)
*B60Q 1/26* (2006.01)
(Continued)

(52) U.S. Cl.
CPC ............ *F16B 21/075* (2013.01); *B60Q 1/263* (2013.01); *B60R 13/0206* (2013.01);
(Continued)

(58) Field of Classification Search
CPC ...... F16C 11/06; F16C 11/0623; F16B 13/04; F16B 21/06; F16B 21/07; F16B 21/076;
(Continued)

(56) References Cited

U.S. PATENT DOCUMENTS 1,691,004 A * 11/1928 Boynton ................. F16B 21/06
24/681
1,691,013 A * 11/1928 Johnson .................. F16B 21/06
24/671
(Continued)

FOREIGN PATENT DOCUMENTS

| CN | 102958762 A | 3/2013 |
| CN | 204591922 U | 8/2015 |

(Continued)

OTHER PUBLICATIONS

Written Opinion & International Search Report for PCT/EP2018/076064 dated Dec. 20, 2018, 12 pages.

(Continued)

*Primary Examiner* — Jonathan P Masinick
(74) *Attorney, Agent, or Firm* — Reising Ethington P.C.

(57) ABSTRACT

An angular coupling for fastening a first component, especially a mounting part in a vehicle, to a second component, especially a vehicle body, which comprises a coupling bolt with a head and a coupling socket in which the coupling bolt can be pivoted in a plane angle portion while the head of the coupling bolt is locked releasably or not releasably. The coupling socket comprises an arch with a push-in opening, a fastening collar surrounding the push-in opening having a not round shape with a longitudinal axis and a shorter transverse axis, wherein the arch encloses a pivoting plane generated by the longitudinal axis of the push-in opening and the push-in direction, which defines a variable angular orientation of the lockable coupling bolt in a plane angle (Continued)

Figure 1:
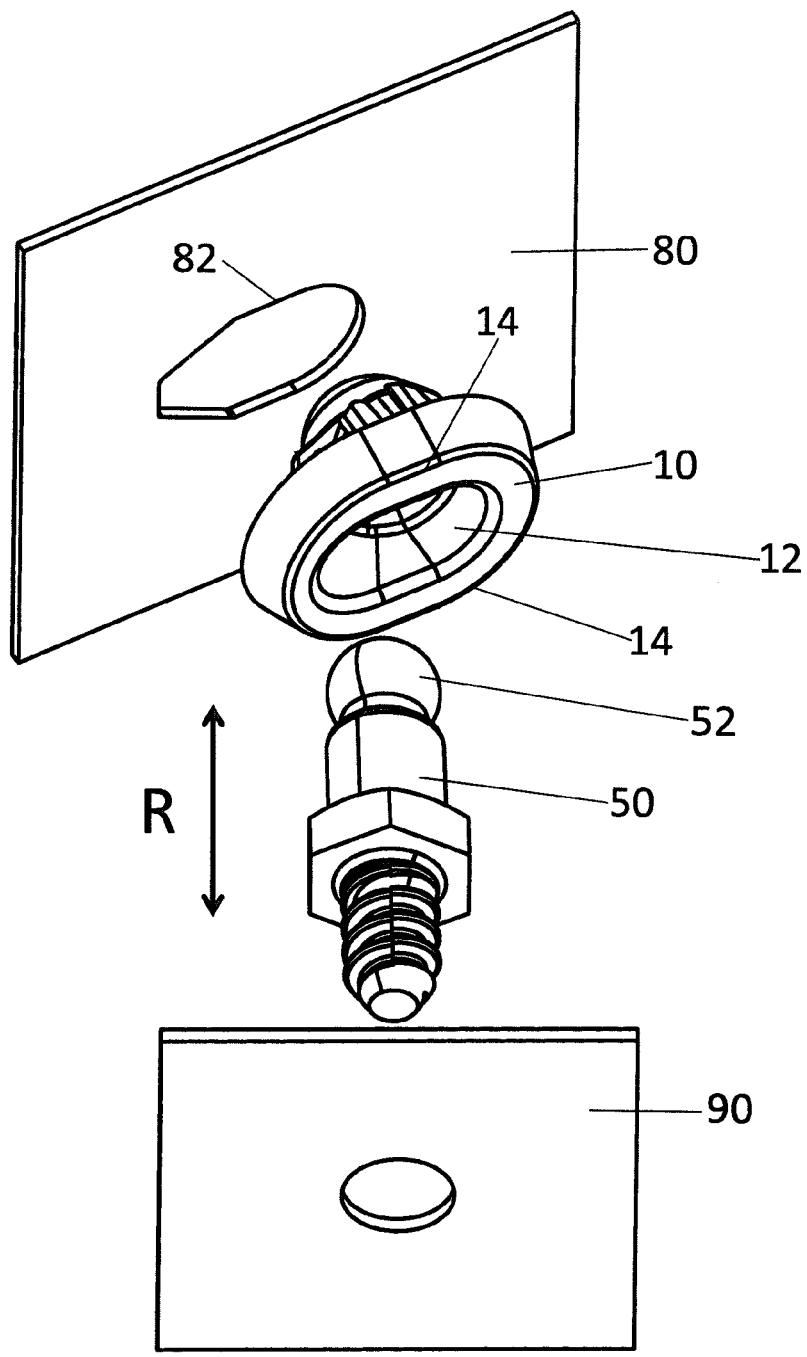

portion which is limited at the maximum by an inner wall of the arch.

20 Claims, 7 Drawing Sheets

(51) Int. Cl.
    *B60R 13/02*     (2006.01)
    *F16B 5/06*     (2006.01)
    *F16C 11/06*     (2006.01)

(52) U.S. Cl.
    CPC ........ *F16B 5/0614* (2013.01); *F16C 11/0623* (2013.01); *B60Q 2200/32* (2013.01)

(58) Field of Classification Search
    CPC ........ F16B 21/078; F16B 5/06; F16B 5/0607; F16B 5/0614; F16B 5/0621; F16B 5/0628; F16B 5/0664
    See application file for complete search history.

(56) References Cited

U.S. PATENT DOCUMENTS

| | | | | |
|---|---|---|---|---|
| 4,111,570 | A * | 9/1978 | Morel | F16C 11/0657 403/321 |
| 4,520,689 | A | 6/1985 | Sucro et al. | |
| 4,865,505 | A * | 9/1989 | Okada | B60R 13/0206 411/512 |
| 5,013,175 | A | 5/1991 | Hayden | |
| 5,443,323 | A | 8/1995 | Prelat et al. | |
| 5,533,237 | A * | 7/1996 | Higgins | F16B 21/075 24/297 |
| 8,495,934 | B2 | 7/2013 | Schneider et al. | |
| 8,602,674 | B2 * | 12/2013 | Loewe | F16C 11/0623 403/135 |
| 8,720,016 | B2 * | 5/2014 | Beaulieu | F16B 21/073 24/457 |
| 9,097,272 | B2 | 8/2015 | van Niekerk et al. | |
| 9,995,331 | B2 * | 6/2018 | Heimann | F16C 11/069 |
| 10,925,798 | B2 * | 2/2021 | Ishibashi | F16C 11/06 |
| 11,209,033 | B2 * | 12/2021 | Spitzer | F16B 21/073 |
| 2007/0253765 | A1 * | 11/2007 | Knopp | F16C 11/0638 403/122 |
| 2008/0175654 | A1 * | 7/2008 | Schilz | F16B 19/1081 403/132 |
| 2015/0034040 | A1 | 2/2015 | Byer | |
| 2018/0252252 | A1 | 9/2018 | Fritzsch et al. | |
| 2021/0355979 | A1 * | 11/2021 | Heinrichs | B60R 13/0206 |

FOREIGN PATENT DOCUMENTS

| | | | |
|---|---|---|---|
| CN | 205744779 U | 11/2016 | |
| DE | 3232926 C2 | 12/1985 | |
| DE | 19739350 A1 | 3/1999 | |
| DE | 202004006969 U1 | 7/2004 | |
| DE | 202009004178 U1 | 5/2009 | |
| DE | 102009021120 A1 | 11/2010 | |
| DE | 102013102197 A1 | 9/2013 | |
| DE | 202015005870 U1 | 11/2016 | |
| DE | 202019105135 U1 * | 1/2021 | |
| EP | 0229350 A2 | 7/1987 | |
| EP | 0572313 B1 | 7/1996 | |
| EP | 0896162 A1 | 2/1999 | |
| FR | 2959284 A1 * | 10/2011 | ............ B60Q 1/263 |
| JP | H0284008 U | 6/1990 | |
| KR | 101218818 B1 * | 1/2013 | |
| WO | WO2009132755 A1 | 11/2009 | |

OTHER PUBLICATIONS

English translation of the International Preliminary Report on Patentability for PCT/EP2018/076064 dated Apr. 14, 2020, (8 pages).

EP Office Action for EP Application No. 18782001.4 dated Dec. 6, 2021, (5 pages).

* cited by examiner

ANGLE COUPLING

1. TECHNICAL FIELD

The present disclosure is related to an angular coupling for fastening a mounting part or attachment part to a supporting structure, especially a lamp to a vehicle body, consisting of a coupling socket for a coupling bolt and the respective coupling bolt.

2. BACKGROUND

In all kinds of technical fields, two parts are connected to each other by means of a coupling bolt and a respective coupling socket for this coupling bolt. In the vehicle construction, the fastening of covers in the engine compartment, of cladding parts in the interior as well as the mounting of lamps at the vehicle body takes place in this way. A similar proceeding can be found in other fields, where a fastening by a simple locking connection is sufficient.

Such couplings consist of a coupling bolt with a ball-shaped head and a coupling socket in which a ball catch for the ball-shaped head is provided. Within the ball catch, the ball-shaped head is received releasably or not releasably when coupling bolt and coupling socket have been connected to each other.

In known couplings, prior to the connecting of coupling bolt and coupling socket, the central longitudinal axes thereof are aligned parallel to each other. On this basis, for example in the vehicle construction, a backlight is mounted to a location of the vehicle body which is provided therefor by an insertion movement in driving direction, thus in x-direction. To this end, the coupling socket is pre-mounted to component walls which are aligned perpendicular to the driving direction. This ensures a problem-free mounting in and locking of the coupling bolt within the coupling socket.

The variety of forms, however, increases not only in the vehicle construction so that for example a backlight has to be fastened in a recess of the body with inclined body walls. The longitudinal axis of coupling sockets for coupling bolts installed on this inclined body walls is oriented perpendicular to the body walls which results in the same time, however, in an angular alignment of this longitudinal axis with respect to the driving direction. Thus, the coupling bolts, for example at the backlight, have to be pre-mounted in an inclined manner so that their longitudinal axis again is parallel to the central longitudinal axis of the socket. Otherwise, no reliable locking of the coupling bolt into the coupling socket which is pre-mounted in the body can be ensured. For achieving this specific alignment of coupling bolt and coupling socket, the pre-mounting of the coupling bolt has become more complicated. Further, despite the specific arrangement of the coupling bolt related to the coupling socket, often a canting or tilting for example of the backlight occurs at the inserting into the recess which is provided therefor in the body with inclined body walls. This tilting lengthens the mounting time and often influences the quality of the mounting result.

In the prior art, different constructions of coupling sockets are known which ensure an angular compensation. To this end, the coupling bolt, often a bolt having a ball head, is inserted into the coupling socket and locked there. The coupling socket of U.S. Pat. No. 4,520,689 serves for transmitting rotational movements in a wiper arrangement of a vehicle. Although the ball head of the coupling bolt is locked rigidly in the coupling socket, due to the design of the interior of the coupling socket, limited movements of the coupling bolt are nevertheless possible. Especially, the coupling bolt may pivot in a solid angle portion of small extension. This solid angle portion is small as the coupling bolt is enclosed completely by the circular edge of the inserting opening of the coupling socket.

EP 0 572 313 B1 and DE 10 2013 102 197 A1 describe each a coupling socket which sets a high extraction force against the removing of the coupling bolt from the coupling socket. With respect to its construction, these coupling sockets prefer a locking of the coupling bolt which ensures besides the support also a pivoting in a solid angle portion at the same time. A plurality of springy webs is arranged in these coupling sockets such that they are inclined in the direction of the interior of the ball socket. As these webs act against the extraction of the coupling bolt from the coupling socket, the extraction forces for the head of the coupling bolt are relatively high.

If the above-mentioned couplings having a possibility of pivoting the coupling bolt in a solid angle portion are used for example for fastening mounting parts in the vehicle construction, these couplings have a high adjustment effort. Because as soon as a mounting part is fastened with for example two couplings which are pivotable in a solid angle portion, the user has to control and adjust upon the installation of the mounting part the clearances in all possible spatial directions accordingly. Further, it is a disadvantage that these mounting parts provided with a high movability require additional mounting points due to the fastening via the above-described couplings for fastening the adjusted mounting parts permanently.

For reducing the adjustment effort upon the installation of mounting parts for example in the vehicle construction, DE 20 2009 004 178 U1 describes an angular coupling which provides a rigid angular arrangement between mounting part and shell structure or vehicle body. This angular coupling adjusted to a rigid angle reduces, however, the mounting effort of the user to a minimum but is at the same time limited to only one case of application. Thus, it is necessary for mounting situations with different angular alignments to produce angular couplings which are especially adapted thereto. Compared to the above-described couplings with pivotability in a solid angle, the angular coupling with rigidly adjusted angle has the advantage that the mounting part can be mounted with a low number of fixpoints to the shell.

For being able to react more flexible to different installation situations and to be able to use a coupling which can, besides having a small mounting effort, also be used flexibly, implementations of the present invention may provide an alternative angular coupling compared to the above-described couplings with solid angle compensation and the coupling with rigid angular adjustment.

3. SUMMARY

The above object is solved by a coupling socket, by an angular coupling, by a manufacturing method for a coupling socket as well as by an installation method for the coupling socket. Further embodiments and developments are set forth in the following description, the accompanying drawings and the appending claims.

The coupling socket in which a head of a coupling bolt for fastening at least two components at each other is lockable comprises the following features: a dome-like arch of a circumferential, optionally closed, wall which comprises an open end with a push-in opening for a pushing-in of the coupling bolt in a push-in direction and an end with an inner locking structure adjacent thereto for the head of the coupling bolt, a fastening collar surrounding the push-in opening and enclosing an opening face of the push-in opening, wherein the push-in opening has a non-round shape so that the opening face can be described by a longitudinal axis and a shorter transverse axis extending transverse thereto, wherein the dome like arch encloses an imaginary pivoting plane which is generated or spanned by the longitudinal axis of the push-in opening and the push-in direction, which defines a variable angular orientation of the lockable coupling bolt in a plane angle range which is delimited at the maximum by an inner wall of the dome-like arch.

The coupling socket serves for the fastening of a head of a coupling bolt. The head of the coupling bolt may comprise different shapes as it is known, for example a ball, a lens or another thickening which can be locked in a receiving space. In combination with the present coupling socket a coupling bolt having a ball head may be used. The other above-mentioned shapes of the head of the coupling bolt are, however, equally usable as long as the shape of the head allows a pivoting of the coupling bolt within the coupling socket in a specific angle range in the locked condition.

According to a further embodiment, the dome-like arch comprises a closed end in which a ball socket may be formed. The closed end supports a sealing function of the coupling socket in combination with the sealing collar which is described in more detail below. It may also be preferred to provide the end of the dome-like arch partly open as long as the fastening of the head of the coupling bolt is ensured.

The dome-like arch comprises further a push-in opening for the coupling bolt. This push-in opening is shaped such that it allows a pivoting of the coupling bolt in a plane in the range of a pivoting angle while it blocks at the same time pivoting movements of the coupling bolt out of this pivoting plane. This blocking acts positive as a lateral support of the coupling bolt while it can be variably adjusted to the desired angle within the pivoting plane. This pivoting provides thus according to the two components to be connected to each other the angular orientation between the coupling bolt and the coupling socket. The above described degree of freedom in the movement of the coupling bolt locked in the coupling socket may be determined by the shaping of the push-in opening of the coupling socket. Because this push-in opening may have an axisymmetric shape which can be described by a longitudinal axis within the above-described pivoting plane and a transverse axis extending transverse thereto. The push-in opening may have an oval shape. According to another embodiment, the push-in opening is formed rectangular with a shorter and a longer side face. The oval shape is for example formed by an ellipse or is composed of circular arcs or straight parts. Decisive for the shape of the push-in opening is that the push-in opening allows along an axis, which may be the longitudinal axis or a longer side, a pivoting of the locked coupling bolt within the coupling socket. Perpendicular to this longitudinal axis, the shaping of the push-in opening may block a further moving of the coupling bolt. These functions are realized by the oval and the rectangular push-in opening.

According to a further embodiment, the lockable coupling bolt can be pivoted in an angle range of $0°<\alpha\leq60°$, or $0°<\alpha\leq45°$ or $0°<\alpha\leq35°$ within the dome like arch when the head of the coupling bolt is locked in the inner locking structure.

According to a further embodiment of the coupling socket, it comprises two sections opposite to each other, wall sections or longer sides of the push-in opening which may be arranged perpendicular to the transverse axis and which form a lateral guiding of the lockable coupling bolt at variable angular orientations of the coupling bolt.

The above-mentioned sections may be formed by linearly extending sections of the edge portion of the push-in opening. According to a further embodiment, the linearly extending sections are formed by wall sections of the arch of the coupling socket. As results from the above-mentioned orientation of these sections, these sections extend parallel to the pivoting plane of the coupling bolt. In the same way, these linear sections extend parallel to the longitudinal axis of the opening face generating the push-in opening. Further, these sections which are arranged opposite to each other may be spaced from each other such that they allow only a movability of the coupling bolt within the pivoting plane. Depending on the geometry of the coupling bolt, tolerances may be present within this movement limitation. Decisive is, however, that these linear sections provide a lateral guiding for the provided angular pivoting movement of the coupling bolt within the coupling socket.

According to a further embodiment, the circumferential wall of the dome-like arch comprises at a radial outer side adjacent to the fastening collar a plurality of circumferentially distributed locking noses with inserting slants which form an undercut opposite to the push-in direction of the coupling bolt into the coupling socket.

For establishing a connection between two components, first of all the coupling socket is arranged in an installation opening of a shell structure. The fastening of the coupling socket in this opening is designed such that an opening edge of the installation opening is retained between the respective undercut faces of the locking noses and the fastening collar of the coupling socket. The undercut faces of the individual locking noses are configured and arranged such that they prevent a releasing of the coupling socket from the installation opening opposite to the installation direction used before.

For supporting the above-described arrangement of the coupling socket in the installation opening, the fastening collar comprises, according to a further embodiment, a circumferentially arranged flexible sealing collar which is arranged tilted in push-in direction of the coupling socket. This sealing collar is formed such that it may extend up to the height of the undercut formed by the locking noses or up to the height of the undercut faces formed at the locking noses.

While the sealing collar abuts after installation of the coupling socket in the installation opening at the shell structure, the sealing collar realizes due to its configuration at least two main functions. The one function consists in that the abutment of the sealing collar at the shell structure ensures a sealing against the entering of liquids or dust or similar into the connection of coupling socket and shell structure. This sealing function is realizable by the springy shape and/or material design of the sealing collar. Further, this sealing function may be supported by the dome-like arch with the closed end (see above).

The spring effect of the sealing collar may lead also to that the individual undercut faces of the locking noses are arranged in abutment at the shell structure adjacent to the edge of the installation opening. This ensures a reliable fastening within the installation opening as well as avoiding of oscillation movements of the coupling socket after installation in the installation opening. In this context, the dome-like arch with partly open or closed end is usable.

According to a further embodiment, the coupling socket comprises at the closed end of the arch a ball socket in combination with a locking web projecting radially inwardly from an inner wall of the arch. By means of this construction, the ball head of the coupling bolt is fastened within the coupling socket in a locking manner and pivotably within a plane angular portion.

The present disclosure further comprises an angular coupling for fastening a first component especially a mounting part in a vehicle, at a second component, especially a vehicle body, comprising a coupling bolt having a head and a coupling socket according to one of the above-described configurations. In this angular coupling, the coupling bolt can be pivoted in an angular range while the head of the coupling bolt is locked releasably or not releasably.

The present disclosure also includes a manufacturing method for the above-described coupling socket which comprises the following steps: providing an injection mold defining the shape of the coupling socket according to one of the above-described embodiments, injection molding of the coupling socket in the injection mold and de-molding the coupling socket from the injection mold.

An alternative manufacturing method for the coupling socket consists in manufacturing the coupling socket according to one of the above-described embodiments by means of an additive method. The additive manufacturing denotes a process at which a component is formed on the basis of digital 3D-construction data layer by layer by depositing material. Generally, these methods are also denoted as 3D-print. It is thus not a normal or conventional removing manufacturing process but a forming of the component layer by layer. For example, plastics and composite materials are usable as materials. These materials are brought in the appropriate shape layer by layer by means of the specific heating and adjacent layers are accordingly connected to each other by means of this energy supply so that for example the above-described coupling socket can be produced.

The present disclosure also includes an installation method for the coupling socket which has been described above according to further embodiments. Within the installation method, the coupling socket may be arranged in a not round, not angular or angular installation opening with opening edge of a component. The installation method comprises the following steps: adjacent to an end of the longitudinal axis of the opening face of the push-in opening, a clamping of a section of the opening edge occurs between at least a locking nose and the fastening collar. Thereafter, a lengthening of the coupling socket in push-in direction or installation direction occurs and the coupling socket is displaced into the installation opening in push-in direction or installation direction. Thereafter, a locking of the coupling socket in the installation opening occurs in that the opening edge is retained between a plurality of locking noses and the fastening collar.

The step of the lengthening of the coupling socket means that by means of a tool engaging in the interior of the arch, the coupling socket is pushed in push-in direction or installation direction. As the fastening collar is held or retained at the opening edge of the installation opening, the tool engaging in the cavity of the coupling socket generates a tension onto the coupling socket in insertion direction. This leads to a stretching of the coupling socket which results in a tapering of the coupling socket in radial direction. In this way, the inserting of the coupling socket into the installation opening is facilitated until the opening edge locks between the undercut face of the individual locking noses and the sealing collar. It has to be noted that the inserting direction and the installation direction are parallel to each other.

4. BRIEF DESCRIPTION OF THE ACCOMPANYING DRAWINGS

Figures 2A, 2B, 2C:
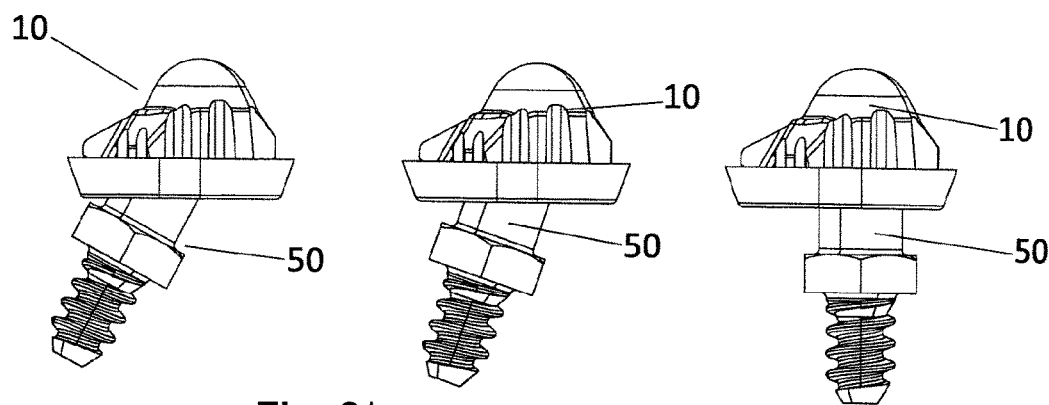
Figure 3:
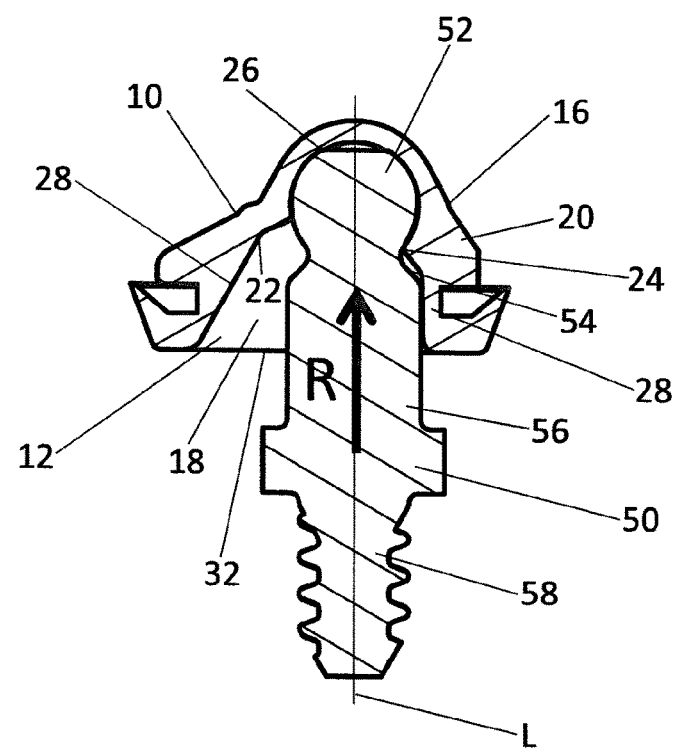
Figure 4:
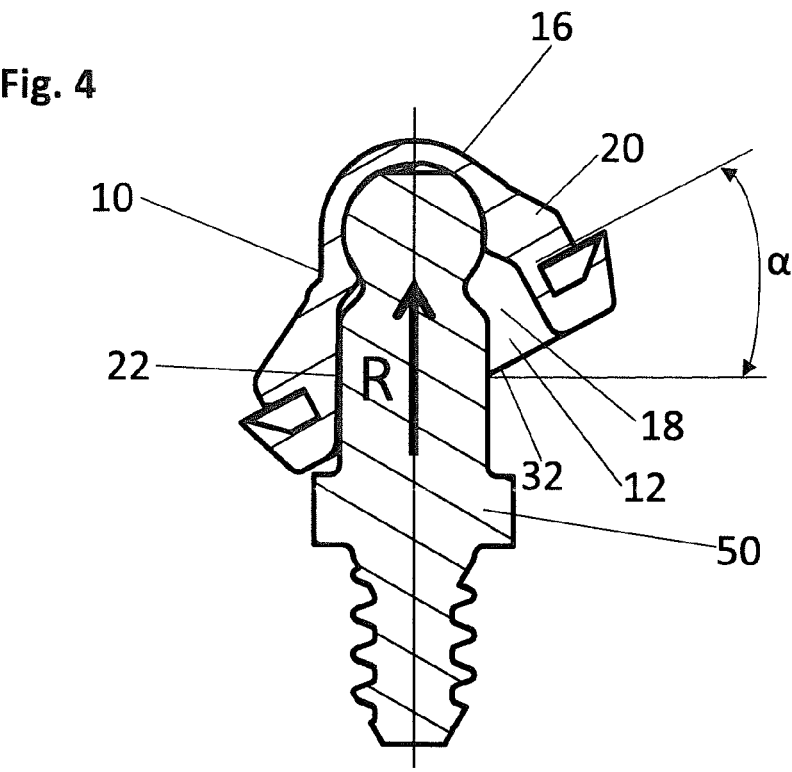
Figure 5:
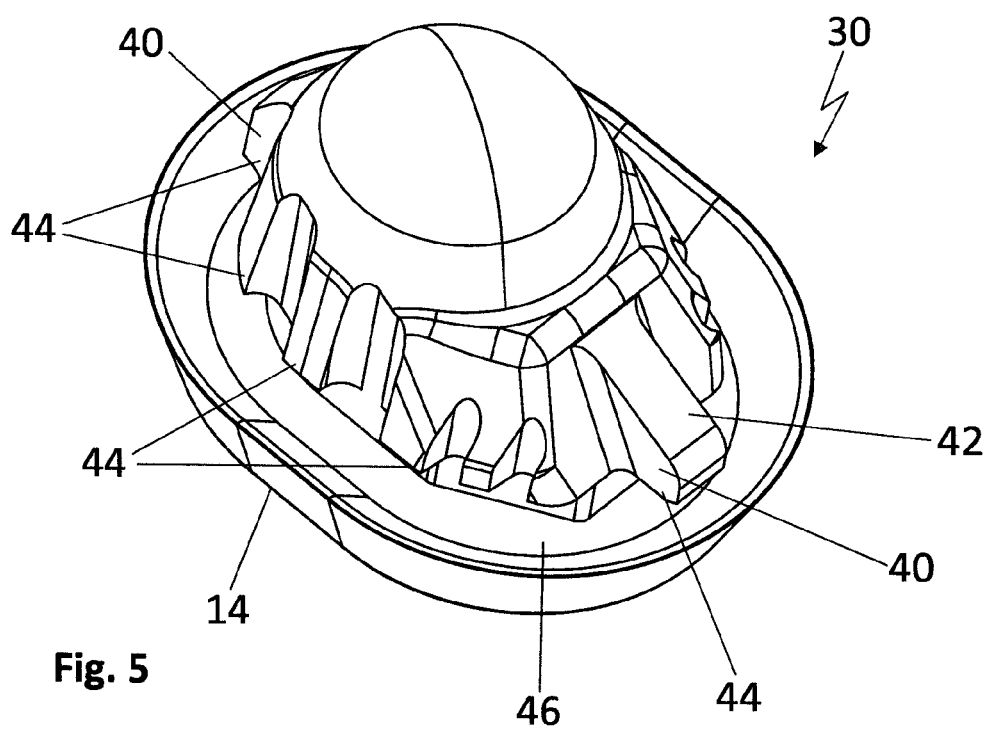
Figure 6A:
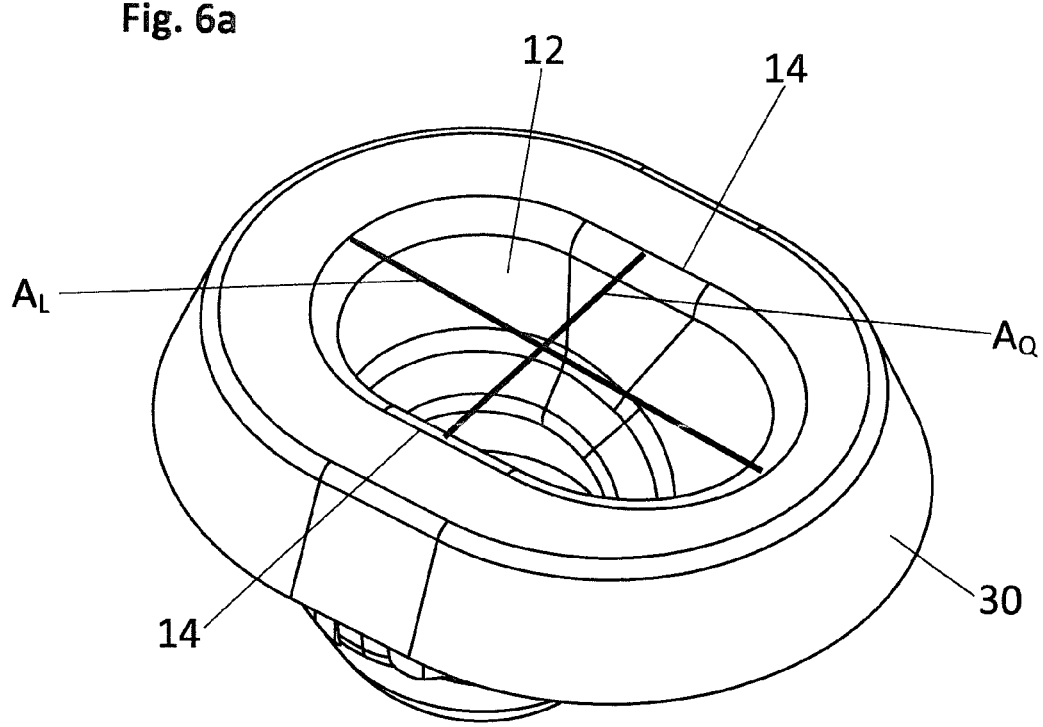
Figure 6B:
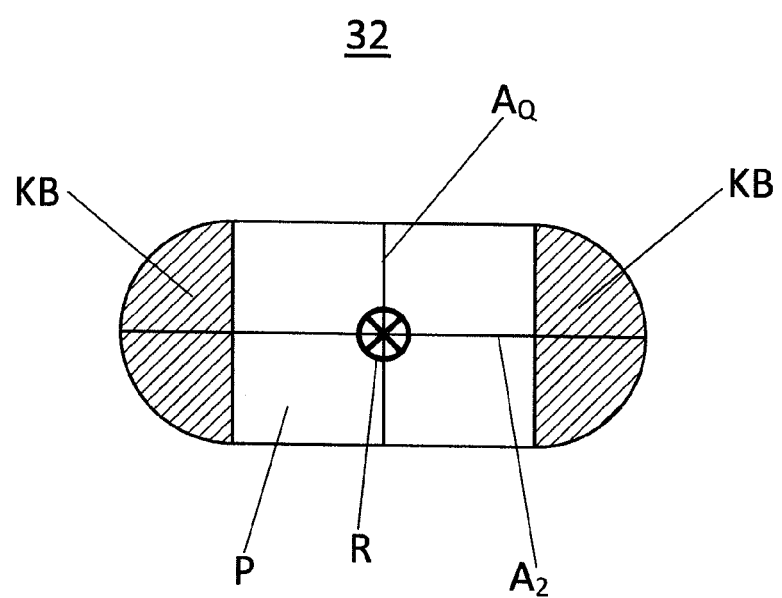
Figure 7:
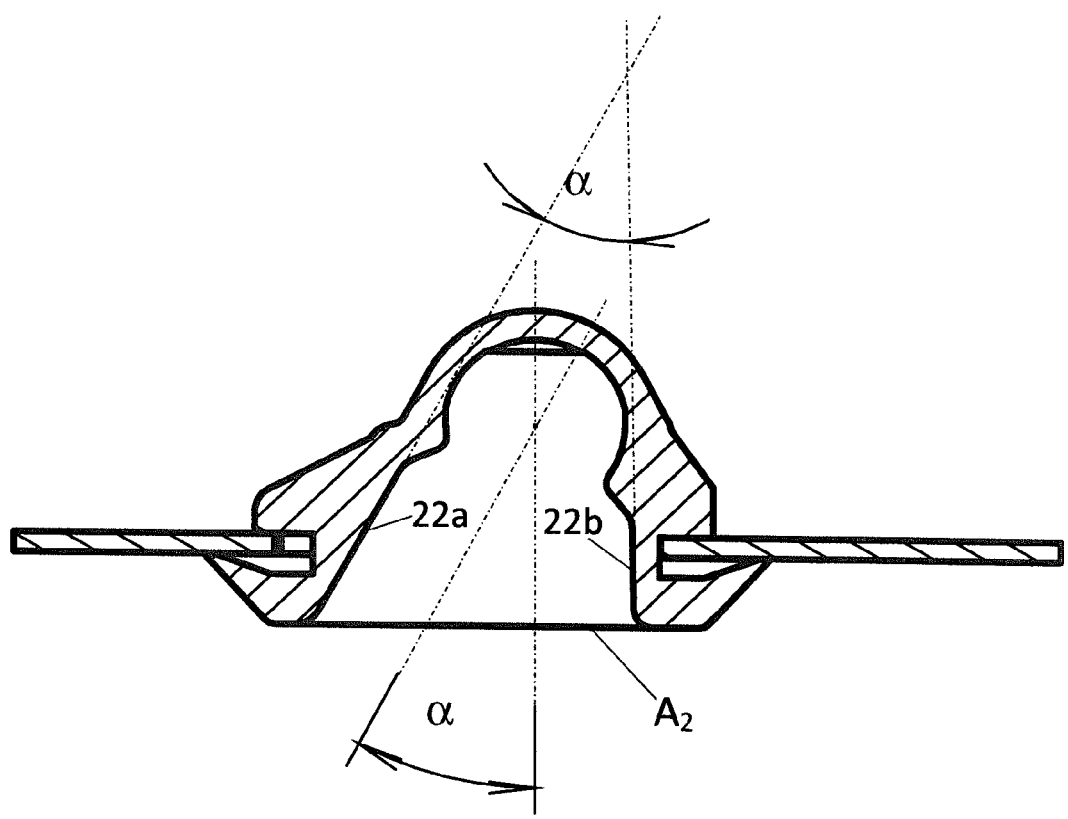
Figure 8:
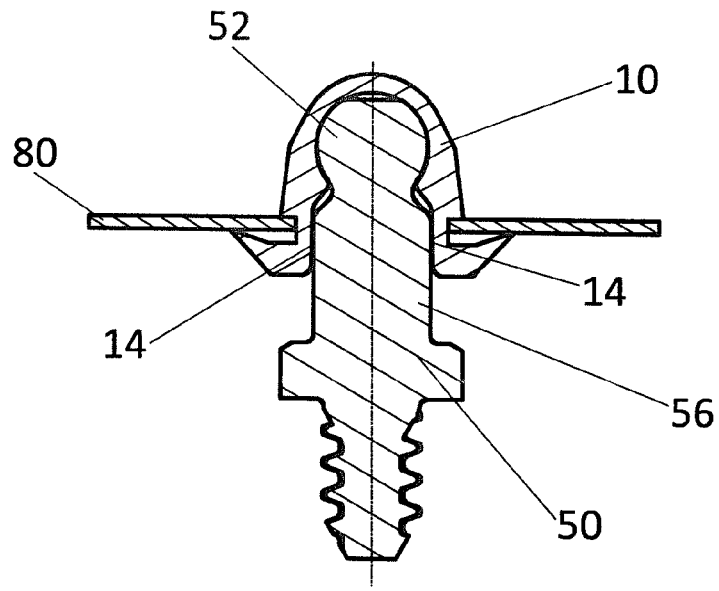
Figure 9:
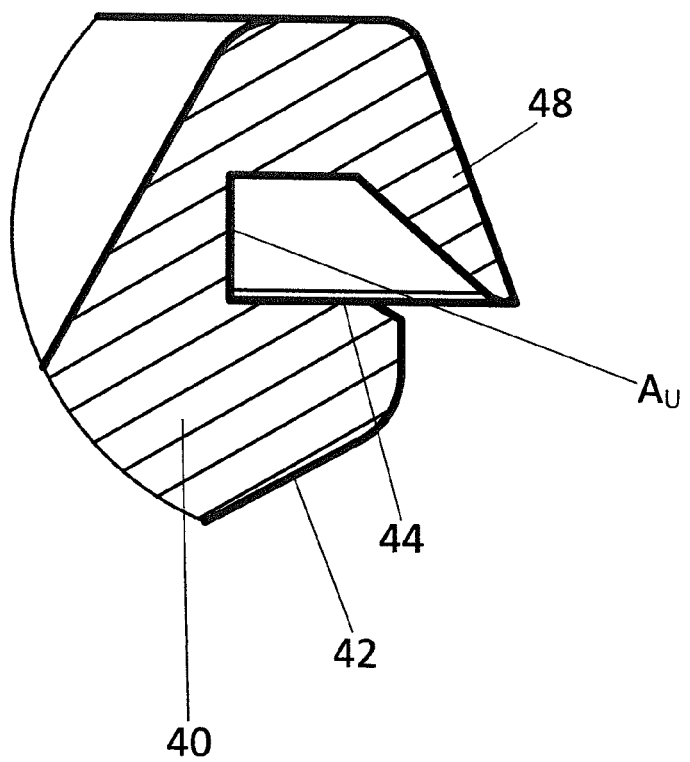
Figure 10:
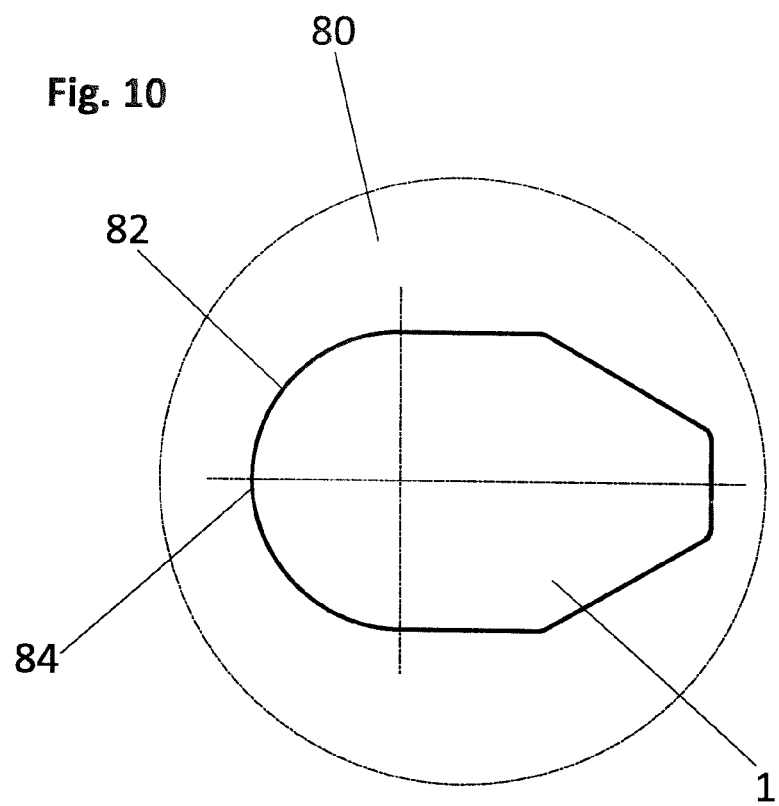
Figure 11:
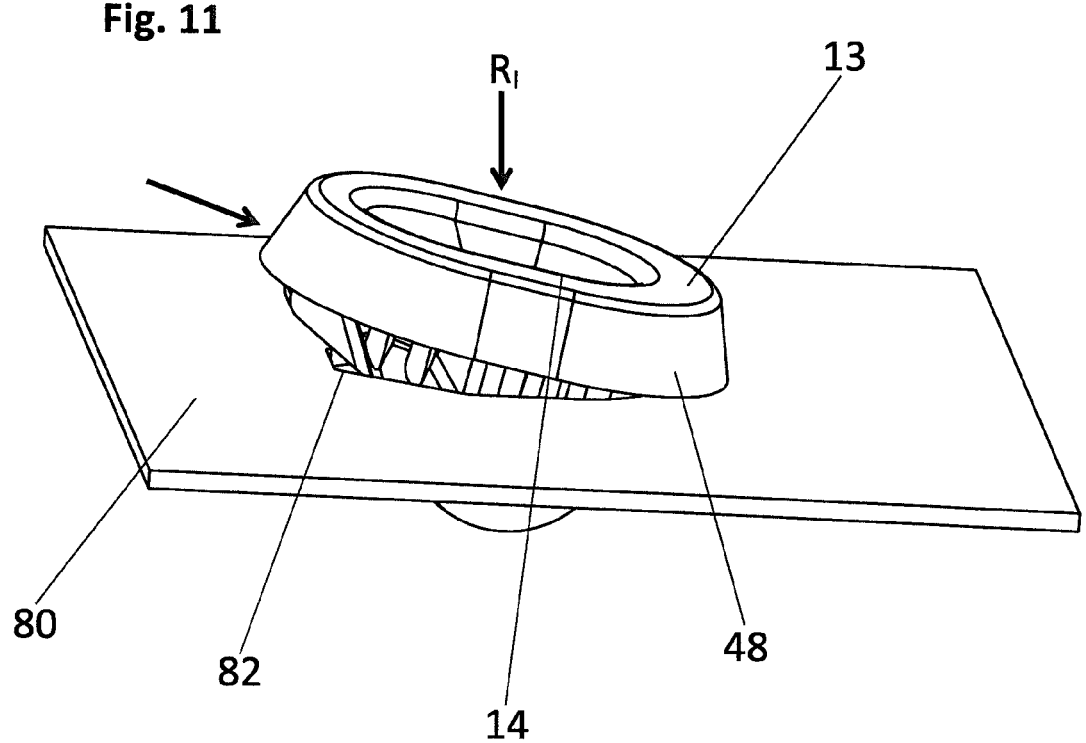

Some embodiments of the present disclosure are explained in detail with respect to the accompanying drawings. It shows:

FIG. 1 a perspective exploded view of the angular coupling with coupling socket and coupling bolt, FIGS. 2*a-c* several perspective lateral views of the coupling bolt locked in the coupling socket in different angular orientations with respect to the coupling socket, FIG. 3 a lateral cross-sectional view of the coupling bolt which is locked in the coupling socket, FIG. 4 a further lateral cross-sectional view of the coupling bolt locked into the coupling socket in another angular orientation with respect to FIG. 3, FIG. 5 a perspective view of a further embodiment of the coupling socket, FIG. 6*a* a further perspective view of an embodiment of the coupling socket, FIG. 6*b* an illustration of a further embodiment of the inserting face of the inserting opening, FIG. 7 a lateral cross-sectional view of the coupling socket for the illustration of the pivoting of the coupling bolt, FIG. 8 a lateral cross-sectional view of the coupling socket parallel to the transverse axis of the inserting opening, FIG. 9 an enlargement of an extract of a construction of the fastening collar with sealing collar and locking noses, FIG. 10 a view of a shape of the installation opening in the first component, FIG. 11 a schematic illustration of an installation step for fastening the coupling socket in the installation opening.

5. DETAILED DESCRIPTION

FIG. 1 shows an exploded view of an angular coupling 1 which is composed of a coupling socket 10 and a coupling bolt 50 with coupling head 52. The coupling socket 10 is fastened in an installation opening 82 of a first component 80. The first component 80 may be a shell structure of a vehicle, a supporting element in the construction industry or a frame element in engineering.

The coupling bolt 50 is connected to a second component 90. Here, it may be a mounting part as for example a lamp or a cover in the vehicle construction or generally a mounting part. The coupling bolt 50 is screwed, glued, riveted, locked or otherwise reliably connected releasable or not releasable to the second component 90 according to known methods.

According to a further embodiment, the coupling head 52 is a ball head. In the following, the coupling bolt 50 with ball head 52 is described exemplarily for all conceivable head geometries. These head geometries include for example a lens head, a polyhedron head or other known head geometries which allow a locking and pivoting in a coupling socket.

The coupling head 52 is releasably lockable in the coupling socket 10. For ensuring a reliable connection despite an angular arrangement of the two components 80, 90 with respect to each other the coupling bolt 50 and the coupling socket 10 are connectable with each other in a variable angular orientation. This means that the coupling bolt 50 can be present in different angular orientations in a pivoting plane with a coupling head 52 locked in the coupling socket 10. By means of these different angular orientations, the angular coupling 1 is variably adapted to different component alignments with respect to each other. These different possibilities of orientation of the coupling bolt 50 in the coupling socket 10 are illustrated in FIGS. 2*a-c*.

FIGS. 3 and 4 show each a cross-section through the coupling socket 10 and the coupling bolt 50. To this end, the coupling bolt 50 is shown in a sectional view in longitudinal direction. The coupling socket 10 is shown in a sectional view parallel to a longer side 14 of an inserting opening 12. As can be seen based on FIGS. 3 to 5 the coupling socket 10 comprises a dome-like arch 16 which forms a receiving and fastening space 18 for the coupling bolt 50. The dome-like arch 16 may consist of a continuous circumferential wall 20. At an inner side 22 of the wall 20, a locking web 24 is provided. The locking web 24 acts together with a ball socket 26 to retain the coupling bolt 50 via the ball head 52 despite the pivotability of the coupling bolt 50. According to FIGS. 3 to 5 the ball socket 26 is arranged adjacent to a closed end of the arch 16. It also may be preferred to form the end adjacent to the ball socket 26 open as long as the fastening of the head of the ball bolt 50 is ensured.

The ball head 52 is connected to a cylindrical shaft 56 by means of a tapered section 54. The cylindrical shaft 56 comprises a fastening end 58, here with a threading to fasten the coupling bolt 50 at the second component 90. The tapered section 54 may form a receiving space for the locking web 24 to ensure a maximum pivotability of the coupling bolt 50 in the ball socket 26 and the pivoting plane.

The cylindrical shaft 56 serves for a radial supporting of the coupling bolt 50 at an inner side of the arch 16 or at least at an inner side 28 of the inserting opening 12. The perspective view of the inserting opening 12 and the receiving or fastening space 18 is shown in FIG. 6.

The inserting opening 12 is surrounded by a fastening collar 30. The fastening collar 30 encloses a plane inserting face 32 which represents the shape of the inserting opening 12. The inserting face 32 thus forms the imagined or fictitious end of the receiving space 18 opposite to the ball socket 26.

The inserting opening 12 and the inserting face 32 may have a not round, not angular or angular shape. The inserting opening 12 may be formed oval so that it can be described with a longitudinal axis $A_L$ and a transverse axis $A_Q$ extending perpendicular thereto (see FIG. 6*a*). In the same way it may be preferred to form the inserting opening 12 in rectangular shape having a long and a short side. In this case, it can also be described by means of the longitudinal axis $A_L$ and the transverse axis $A_Q$.

The inserting opening 12 in the oval shape may be symmetrically to the longitudinal axis $A_L$ and to the transverse axis $A_Q$. Further, the shape of the inserting opening 12 and thus also the inserting face 32 may be formed by a central parallelogram P and two circular arcs KB which are arranged opposite to each other (see FIG. 6*b*). The circular arc portions KB may provide the abutment portions of the fastening collar 32 at which the cylindrical shaft 54 of the coupling bolt 50 abuts at a maximum angular displacement. Exemplarily for a rectangular inserting opening 12, the parallelogram P without the circular arcs KB may be used.

The sides of the parallelogram P which are arranged opposite to each other, which are not arranged adjacent to circular arcs KB, illustrate inner straight extending wall sections 28 of the inserting opening 12 or the coupling socket 10. These straight extending wall sections support the cylindrical shaft 56 of the coupling bolt 50 laterally and/or limit its lateral displacement in the direction of the transverse axis $A_Q$. Thus, the wall sections 28 or a respective boundary of the fastening collar 30 ensure that the coupling bolt 50 is adaptable only in its pivoting plane to angular orientations of the components 80, 90 to be connected. It is understood that for this purpose the wall sections 28 or the respective portions of the fastening collar 30 should not clamp the cylindrical shaft 56 of the coupling bolt 50 but should be arranged with a gap thereto which allows the pivoting movement.

The inserting direction R is described by the course of a straight line. This may extend through a point of the longitudinal axis $A_L$ of the inserting opening 12 or the inserting face 32 representing the same and through a geometric central point M of the ball socket 26. Even if the ball socket 26 is generally formed as socket for the coupling head 52 it clamps the coupling head 52 in a centered position whereby also a geometric central point of the socket is determined.

Further, the straight extending sections of the longer side 14 of the inserting opening 12 force the coupling bolt 50 into a central position between these longer sides 14. In the locked condition of the coupling bolt 50 its longitudinal axis L thus may extend through the geometric central point M of the ball socket 26 and a point of the longitudinal axis $A_L$ of the inserting opening 12.

The size of the plane pivoting angle α of the coupling bolt 50 is limited by the inner wall 52 of the arch 16 which is arranged adjacent on both sides. At the inner wall 22, the coupling bolt 50 may abut by means of the cylindrical shaft 56 if the coupling bolt 50 has been pivoted at a maximum.

If the inner wall sections 22*a*, 22*b* at which the coupling bolt 50 may abut at maximum displacement are approached by straight lines (see dotted lines in FIG. 7) the intersection thereof defines the maximum plane pivoting angle α of the coupling bolt 50. The coupling bolt 50 may be planely or two-dimensionally pivotable in the locked condition in an angle range of $0°<\alpha\leq60°$, or $0°<\alpha\leq45°$ or $0°<\alpha\leq35°$ within the dome-like arch.

According to the embodiment of the coupling socket 10 shown in FIG. 7, the inner wall 22*a* is arranged almost perpendicular to the inserting face or to the longitudinal axis $A_L$ of the inserting opening 12. It also may be preferred to arrange also the inner face 22*a* in an acute angle with respect to the inserting face or the longitudinal axis $A_L$ of the inserting opening 12 to increase the plane pivoting angle α of the coupling bolt 50. In this embodiment, both inner faces 22*a*, 22*b* would be arranged in an acute angle with respect to the inserting face.

FIG. 8 shows a lateral sectional view along the longitudinal axis L of the coupling bolt 50 and parallel to the transverse axis $A_Q$ of the inserting face or the inserting opening 12. It can be seen that the longer sides 14 of the inserting opening 12 may support the cylindrical shaft 56 of the coupling bolt 50 and force the shaft 56 in the orientation of the pivoting plane. Due to this, a displacement of the coupling bolt 50 out of the above-described pivoting plane is prevented.

With respect to FIG. 5, the coupling socket 10 comprises at the outer side several locking noses 40 with installation inclinations or slants 42. If the coupling socket 10 is pushed in the installation opening 82 of the component 80, an edge of the installation opening 82 slides along the installation slant 42 and locks between a locking face 44 and an abutment face 46. The locking face 44 forms an undercut against a releasing of the coupling socket 10 out of the installation opening 82.

At the fastening collar 30, additionally a circumferential sealing collar 48 is arranged. The sealing collar 48 is inclined in the direction of the locking noses 40. An installed edge of the installation opening 82 which is arranged between the sealing collar 48 and the locking faces 44 is thus pressed from the sealing collar 48 against the locking faces 44. As the sealing collar 48 may abut completely at the surface of the component 80, it seals in this way the connection of coupling socket 10 and component 80 to the outside. The sealing collar 48 may extend to this end up to the height of the locking faces 44 as it is shown in FIG. 9.

It may further be preferred to adapt the course and the arrangement of the outer circumferential face $A_U$ of the coupling socket 10 in such a way to the course of the edge and the dimension of the installation opening 82 that the coupling socket 10 is retained in a radial press fit in the installation opening 82. In this way, loads induced by oscillations of the component 80 of the coupling socket 10 are reduced and the lifetime of the coupling socket 10 and thus of the connection of coupling socket 10 and coupling bolt 50 are increased.

According to a first embodiment, the above-described coupling socket is produced or manufactured as part of an injection molding method. For this purpose, an injection mold is manufactured which defines the above-described or a selection of the above-described constructive features of the coupling socket in a complementary shape. As soon as this injection mold is present, the injection molding of the coupling socket 10 in the injection mold takes place in a second method step. After a hardening of the coupling socket 10 in the injection mold, it is de-molded in a further step from the injection mold.

As an alternative to an injection molding method, it may also be preferred to manufacture or produce the coupling socket with the above-described constructive features or a selection thereof by means of an additive method. Such additive methods are also known as 3D-print method.

The coupling socket 10 may be produced from a material of the TPE family. This material may be provided with different degrees of hardness depending on the case of application. To the TPE family belong for example Santoprene or Arnitel. According to a further embodiment, the coupling socket 10 may consist of Arnitel having a hardness of 33 Shore D. This material provides a smooth surface so that the mounting of the coupling socket 10 in the installation opening 82 is supported. It may also be preferred to adjust the hardness of the material such that it supports the installation of the coupling socket 10 in the installation opening 82. Accordingly, the above-mentioned hardness of the material may be decreased or increased.

With respect to FIG. 10, the installation opening 82 is adapted in its shape to the outer shape or the course of the outer circumferential face $A_U$ or coupling socket 10. According to the different embodiments of the inserting opening 12 (see above) also the installation opening 82 is formed. Thus, it may also be preferred to form the installation opening 82 rectangularly (not shown). For installing the coupling socket 10 in the installation opening 82, first of all an opening edge 84 is clamped adjacent to a shorter side 13 of the installation opening 12 between the sealing collar 48 and at least a locking face 44. In a subsequent installation step, a pin-like tool is inserted in the receiving space 18 of the coupling socket 10 and the coupling socket 10 is pushed in installation direction RI into the installation opening 82. Due to this pressure which is applied by the inserted tool, the coupling socket 10 is lengthened in installation direction. This results at the same time in that the coupling socket 10 is tapered in radial direction so that the edge 84 of the installation opening 82 may slide more easily on the installation slants 42 and can lock between the locking faces 44 and the sealing collar 48. The locking of the edge 84 between the locking faces 44 and the sealing collar 48 results also in that the connection between component 80 and coupling socket 10 is sealed by the circumferential sealing collar 48.

As soon as the coupling socket 10 is reliably arranged in the installation opening 80 the coupling head 52, such as a ball head, of the coupling bolt 50 can be locked into the coupling socket 10.

The invention claimed is:

1. A coupling socket in which a head of a coupling bolt for fastening at least two components at each other is lockable and which comprises the following features:
    a. a dome-like arch of a circumferential wall which comprises an open end with a push-in opening for a pushing-in of the coupling bolt in a push-in direction and an end with an inner locking structure adjacent thereto for the head of the coupling bolt,
    b. a fastening collar surrounding the push-in opening and enclosing a plane opening face of the push-in opening representing a shape of the push-in opening,
    c. the push-in opening has a non-circular shape so that the plane opening face can be described by a longitudinal axis and a shorter transverse axis extending transverse thereto, wherein
    d. the dome like arch encloses a pivoting plane which is spanned by the longitudinal axis of the push-in opening and the push-in direction, which defines a variable angular orientation of the lockable coupling bolt in a plane angle range which is delimited at the maximum by an inner wall of the dome-like arch.

2. The coupling socket according to claim 1, in which the push-in opening has an oval shape.

3. The coupling socket according to claim 2, in which a lockable coupling bolt can be pivoted in an angle range of $0°<\alpha\leq60°$ within the dome like arch when the head of the coupling bolt is locked within the inner locking structure.

4. The coupling socket according to claim 2, comprising two sections opposite to each other which are arranged perpendicular to the transverse axis and which form a lateral guiding of the lockable coupling bolt at variable angular orientations of the coupling bolt.

5. The coupling socket according to claim 2, the circumferential wall of which comprises at a radial outer side adjacent to the fastening collar a plurality of circumferentially distributed locking noses with inserting slants which form an undercut opposite to the push-in direction.

6. The coupling socket according to claim 2, the fastening collar of which comprises a circumferentially arranged flexible sealing collar extending in push-in direction of the coupling socket.

7. The coupling socket according to claim 2, comprising at the end of the arch a partly open or closed ball socket in combination with a locking web projecting radially inwardly from the inner wall of the arch as the inner locking structure.

8. The coupling socket according to claim 1, in which a lockable coupling bolt can be pivoted in an angle range of $0°<\alpha\leq60°$ within the dome like arch when the head of the coupling bolt is locked within the inner locking structure.

9. The coupling socket according to claim 8, comprising two sections opposite to each other which are arranged perpendicular to the transverse axis and which form a lateral guiding of the lockable coupling bolt at variable angular orientations of the coupling bolt.

10. The coupling socket according to claim 8, the circumferential wall of which comprises at a radial outer side adjacent to the fastening collar a plurality of circumferentially distributed locking noses with inserting slants which form an undercut opposite to the push-in direction.

11. The coupling socket according to claim 8, the fastening collar of which comprises a circumferentially arranged flexible sealing collar extending in push-in direction of the coupling socket.

12. The coupling socket according to claim 8, comprising at the end of the arch a partly open or closed ball socket in combination with a locking web projecting radially inwardly from the inner wall of the arch as the inner locking structure.

13. The coupling socket according to claim 1, comprising two sections opposite to each other which are arranged perpendicular to the transverse axis and which form a lateral guiding of the lockable coupling bolt at variable angular orientations of the coupling bolt.

14. The coupling socket according to claim 1, the circumferential wall of which comprises at a radial outer side adjacent to the fastening collar a plurality of circumferentially distributed locking noses with inserting slants which form an undercut opposite to the push-in direction.

15. The coupling socket according to claim 1, the fastening collar of which comprises a circumferentially arranged flexible sealing collar extending in push-in direction of the coupling.

16. The coupling socket according to claim 1, comprising at the end of the arch a partly open or closed ball socket in combination with a locking web projecting radially inwardly from the inner wall of the arch as the inner locking structure.

17. An angular coupling for fastening a first component at a second component, comprising a coupling bolt having a head and a coupling socket according to claim 1 in which the coupling bolt can be pivoted in a plane angle range while the head of the coupling bolt is locked releasably or not releasably.

18. A manufacturing method for a coupling socket according to claim 1, which comprises the following steps:
   a. providing an injection mold defining the shape of the coupling socket according to claim 1,
   b. injection molding of the coupling socket in the injection mold and
   c. de-molding the coupling socket from the injection mold.

19. A manufacturing method for a coupling socket according to claim 1, in which the coupling socket according to claim 1 is manufactured by means of an additive method.

20. An installation method for the coupling socket according to claim 1 in a not round installation opening with opening edge of a component, which comprises the following steps:
   a. adjacent to an end of the longitudinal axis of the opening face of the push-in opening, clamping a section of the opening edge between at least a locking nose and the fastening collar,
   b. lengthening the coupling socket in push-in direction and displacing the coupling socket in push-in direction R into the installation opening and
   c. locking the coupling socket in the installation opening in that the opening edge is retained between a plurality of locking noses and the fastening collar.

\* \* \* \* \*